June 22, 1943.  J. O. REED  2,322,252
APPARATUS FOR WASHING OLEORESIN
Filed June 6, 1941
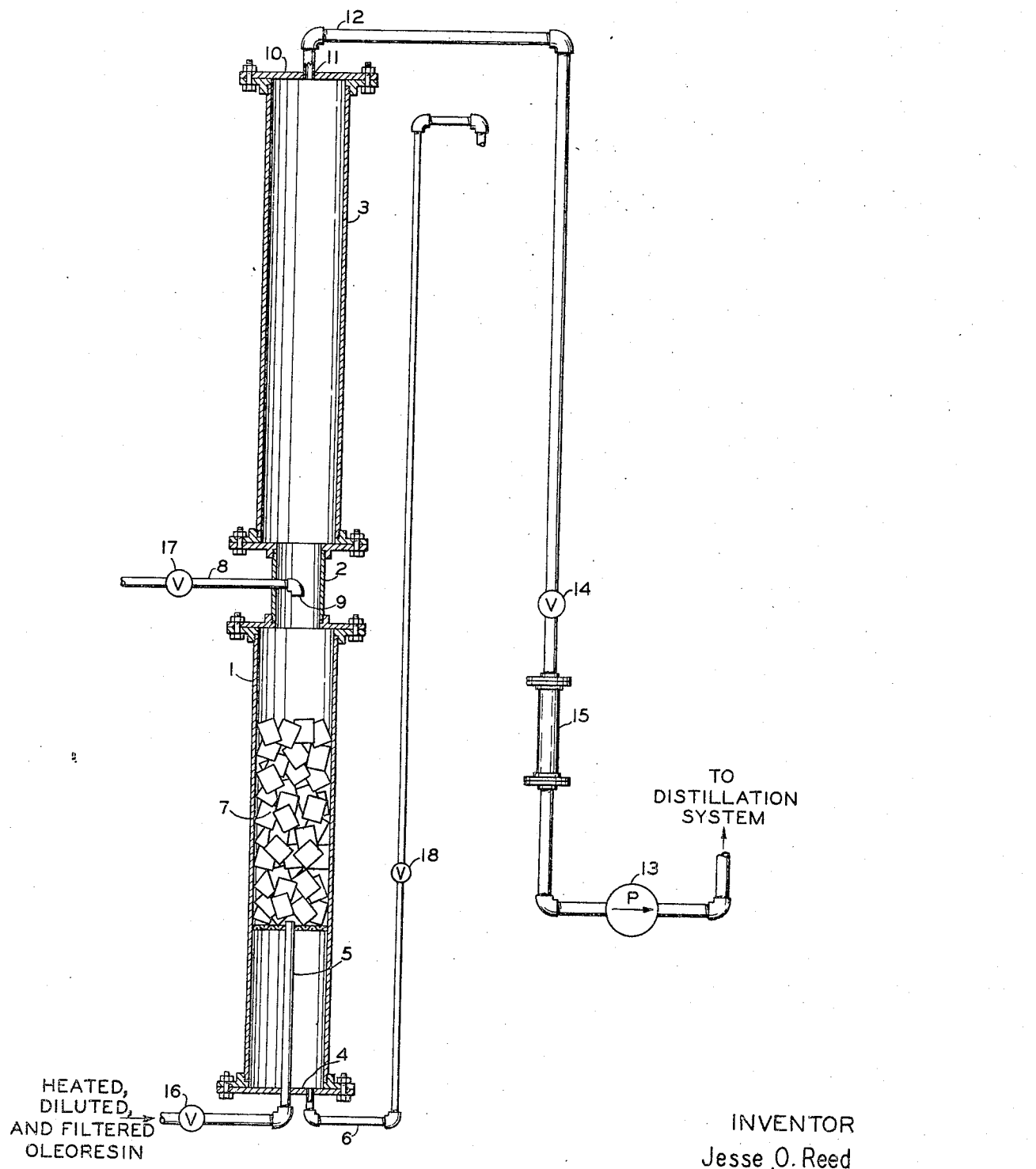
INVENTOR
Jesse O. Reed
BY
ATTORNEY Patented June 22, 1943

2,322,252

UNITED STATES PATENT OFFICE 2,322,252

APPARATUS FOR WASHING OLEORESIN

Jesse O. Reed, Washington, D. C., assignor to Claude R. Wickard, as Secretary of Agriculture of the United States of America, and to his successors in office Application June 6, 1941, Serial No. 396,912

3 Claims. (Cl. 210—52.6)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to me of any royalty thereon.

This invention relates to an apparatus for continuous washing of oleoresin.

The object of my invention is to provide an apparatus for washing crude oleoresin in a continuous system for refining crude oleoresin.

Another object of my invention is to provide an apparatus for washing diluted filtered oleoresin as quickly as possible. Tests have shown the advantages of refining and distilling crude oleoresin as quickly as possible after the first application of heat to the crude oleoresin.

Investigations have shown that crude oleoresin, from which all visible foreign material has been removed by filtration, will still produce a rosin that contains visible particles of matter. Further investigations have shown that the contaminating materials not removable by filtration are water solubles retained in water present in the crude oleoresin.

Several methods have been devised for the removal of water existing in crude oleoresin. One method is to heat the oleoresin, dilute it to a turpentine content of at least 35%, filter, and allow the water to settle from the diluted filtered gum. Tests have shown that the separation by dilution, heating, and settling of the undissolved water contained in the water-oleoresin emulsion alone is not sufficient to remove all of the water-soluble constituents. This is due mainly to the solubility of water in oleoresin. The most satisfactory method of removing water solubles from the water dissolved in the oleoresin is by copiously washing the oleoresin with fresh hot water.

Up to the present time, the processes used for refining crude oleresin operate on a fixed quantity of material, or "batch," being handled at one time. In a "batch" process, it is possible to add fresh hot water to a quantity of diluted filtered oleoresin in a tank, accompanied by violent stirring, or other means, thereby causing intimate contact between the oleoresin and the water. This violent agitation of the fresh water with the filtered oleoresin washes from the oleoresin the water solubles retained by the oleoresin in solution. The effectiveness of the washing operation is dependent upon the amount of water used, the degree of agitation, temperature, percent of dilution of the oleoresin, and the physical and chemical properties of the crude oleoresin, which vary during the oleoresin producing season.

The accompanying drawing illustrates, diagrammatically, a convenient arrangement of a preferred apparatus for carrying out my invention.

The apparatus consists of a lower elongated cylindrical tube 1 forming the wall of a lower elongated chamber, a restricted midsectional piece, or tube, 2, and an upper elongated tube 3 forming the wall of an upper elongated chamber, these parts thus forming an elongated tubular column. Tube 1, preferably made of glass piping, has flanged bottom 4, through which passes pipes 5, and 6. Pipe 5 extends above bottom 4, for a distance of approximately 1 foot, or more. Above the opening of pipe 5 tube 1 is filled with packing 7, preferably with ceramic tower packing, folded pieces of wire mesh, or "glaucosil" (Chem. Abs. Indexes 1926, 1927, 1933, 1937, 1938) supported on a perforated member 7' such as a screen. Between the top of pipe 5 and bottom 4 it is preferably not to have packing which is accomplished by having the pipe 5 discharge into the space above the perforated member as illustrated.

Tube 2, fitted between tubes 1 and 3, is fitted with pipe 8 having a nozzle 9. Nozzle 9 is turned downward in the center of midsection 2.

Tube 3, preferably of glass, extending above midsection 2, is covered with top 10, having discharge opening 11, to which is fitted pipe 12. Pipe 12 extends downward along the outside of tube 1 and section 2 to pump 13. In pipe 12 valve 14 and sight glass 15 are adapted to control the rate of flow of material being discharged from tube 3.

Pipe 6 extends on the outside from bottom 4 to a point near top 10. Pipe 5 leads from the source of filtered diluted oleoresin. The rate of feed to tube 1 is controlled by valve 16 on pipe 5. The rate of water feed to nozzle 8 is controlled by valve 17.

In a preferred operation of my invention, heated, filtered oleoresin, diluted to a turpentine content of at least 35% is fed into tube 1, through pipe 5, at a uniform rate of flow, which is governed by valve 16. Hot water, approximately 185° F., and not exceeding 210° F., preferably deaerated, enters section 2 through nozzle 9 and pipe 8, the rate of flow being governed by valve 17. The hot water from nozzle 9 immediately settles down through the column oleoresin in tube 1, due to the gravity of the diluted hot oleoresin being lower than water. On the other hand, the oleoresin from pipe 5 rises to a level above the water and enters tube 3. Tube 3 is filled with oleoresin and is kept filled by the siphon action formed by pipe 12 and by the height of the water column formed in pipe 6, from which is discharged the washings from the oleoresin from tube 1.

For continuous operation, tube 3, tube 2, and tube 1, above the outlet of pipe 5, is kept filled with oleoresin by means of valves 16 and 14. Hot water for washing is fed into the system through nozzle 9. As the water settles, it comes into intimate contact with the oleoresin rising through wire screen, or tower packing, 7. I have found that a very thorough washing action is thereby obtained. The restricted area in tube 2 makes possible a very close contact between the fresh hot water discharging from nozzle 9, and the well washed oleoresin that has risen to this point in the system. This final contact of the oleoresin and water causes a thorough removal of the water solubles originally present in the oleoresin.

The washed oleoresin in rising through tube 3 to outlet pipe 12 progressively loses a large percentage of the residual water originally present in the oleoresin, as well as the fresh hot water discharged from nozzle 9. This upward movement of the oleoresin in tube 3 causes a settling action, so that when it reaches outlet pipe 12 there is very little entrained water present.

The diameter of tubes 1 and 3 determines, to a considerable degree, the output of the apparatus. It is necessary that the amount of water fed through nozzle 9 be controlled, so that a velocity or rate of fall of water in tube 1 be somewhat less than the velocity of the oleoresin rising in these tubes. This principle of counterflow not only requires a minimum amount of hot water, but enables my apparatus to function so that the oleoresin is quickly washed and made ready for distillation.

Tube 3 not only serves as a settling chamber and a reservoir, but also, because of the siphon effect caused by pipe 12, it is possible to maintain a continuous rate of discharge, controlled by valve 14, from the apparatus, independent of the rate of delivery, and thereby provides a constant rate of delivery of washed oleoresin to a continuous turpentine still, not shown, through pump 13.

Tests have shown that an unsatisfactory and uneven rate of discharge is obtained if no siphon effect is maintained at discharge opening 11, even though a close regulation of the rate of feeding oleoresin into the system is maintained through pipe 5. Tube 3, together with valve 14, therefore, serves as a regulator which co-ordinates the functioning of a continuous oleoresin refining system with a continuous distillation system.

By closing valve 18, tubes 1 and 3 become filled with water from nozzle 9, and all oleoresin within the system can be discharged through pipe 12. The space in tube 1 below outlet of pipe 5 is kept free of oleoresin by adjustment of feed valve 16, so that the oleoresin can be separated from wash water before it reaches discharge pipe 6.

Another method by which my invention may be practiced is to maintain the oleoresin within tube 3, and water within tube 1, by the adjustment of feed valve 16 and discharge valve 14. The diluted filtered oleoresin from pipe 5 is allowed to rise within tube 1 through the water therein, thereby bringing the oleoresin into intimate contact with the water feed through nozzle 9. This contact of the oleoresin with the water causes a thorough removal of the water solubles originally present in the oleoresin.

The washed oleoresin in rising through tube 3 to outlet pipe 12 progressively loses a large percentage of the residual water originally present in the oleoresin, as well as the fresh hot water discharged from nozzle 9. This upward movement of the oleoresin in tube 3 causes a settling action, so that when it reaches outlet pipe 12 there is very little entrained water present.

Because of the flexibility of operation and the siphoning action caused by pipe 12 and valve 14, it is possible to obtain satisfactory operation of my system in a continuous process, and to cause a constant flow of oleoresin into a continuous distillation system, not shown, without having to rely upon whether the operation of an oleoresin refining system, not shown, is continuous, or not.

Having thus described my invention, what I claim for Letters Patent is:

1. An apparatus for washing oleoresin, comprising upper and lower elongated chambers, a tube of restricted sectional area connecting said chambers, means for introducing oleoresin to be washed into the lower chamber at a point sufficiently high that space in the lower chamber below the point of introduction may be kept free of oleoresin, a pipe for introducing wash water into the tube, the outlet of said pipe being at the center of said tube and facing said lower chamber, a discharge pipe for removal of washed oleoresin from the top portion of said upper chamber, said discharge pipe having a control valve therein, and a discharge pipe connected to the bottom of the lower chamber for removal of the washings from the oleoresin.

2. An apparatus for washing oleoresin, comprising an elongated tubular column having a restricted midsectional portion, means for introducing oleoresin to be washed into the lower end of the said column at a point sufficiently high that the space in the column below the point of introduction may be kept free of oleoresin, a pipe for introducing water into the restricted portion, the outlet of said pipe being at the center of said portion facing downwardly, a discharge pipe for removal of washed oleoresin from the top of the column, and a discharge pipe connected to the bottom of the column for removal of the washings from the oleoresin.

3. An apparatus for washing oleoresin, comprising an upper elongated chamber, a lower elongated chamber, a tube of restricted sectional area connecting the said chambers, packing supported in the upper portion of the lower chamber, means for introducing oleoresin to be washed into the portion of the lower chamber containing the packing, a pipe for introducing wash water into the tube, the outlet of said pipe being at the center of said tube, a discharge pipe having a control valve therein for removal of washed oleoresin from the top portion of said upper chamber, and a discharge pipe having a control valve therein for removal of the washings from the oleoresin from the bottom portion of the lower chamber.

JESSE O. REED.